United States Patent [19]

Azuma et al.

[11] 4,153,922

[45] May 8, 1979

[54] RELAY CONTROL CIRCUIT

[75] Inventors: Nobuo Azuma, Yokohama; Yuuhei Abe, Fujisawa; Katsuo Mohri, Yokosuka; Yuhiko Yabe, Tochigi, all of Japan

[73] Assignee: Hitachi, Ltd., Japan

[21] Appl. No.: 856,978

[22] Filed: Dec. 2, 1977

[30] Foreign Application Priority Data

Dec. 3, 1976 [JP] Japan ................................ 51-144805
Dec. 3, 1976 [JP] Japan ................................ 51-144806

[51] Int. Cl.[2] ................................................ H02H 7/22
[52] U.S. Cl. ........................................... 361/3; 361/6; 361/185
[58] Field of Search .................... 361/3, 6, 5, 7, 2, 31, 361/30, 33, 185, 187, 195, 196, 88, 89; 307/127, 130, 131, 135, 137, 252 UA; 323/18

[56] References Cited

U.S. PATENT DOCUMENTS

| | | | |
|---|---|---|---|
| 3,243,656 | 3/1966 | Baude | 361/5 |
| 3,560,796 | 2/1971 | Landis | 37/127 X |
| 3,925,688 | 12/1975 | Kalfus | 323/18 X |
| 4,010,386 | 3/1977 | Rossell | 37/252 UA |

*Primary Examiner*—Patrick R. Salce
*Attorney, Agent, or Firm*—Craig & Antonelli

[57] ABSTRACT

A relay control circuit is disclosed in which a timer circuit is actuated by a reference clock pulse in synchronism with an AC voltage supplied by a commercial power supply. An output signal of the timer circuit causes current to flow in the coil of the relay thereby to close the contact of a relay. The invention further comprises a polarity-reversing device for reversing the polarity in accordance with the variations in the output signal of the timer circuit. The reference clock pulse is applied to the timer circuit through the polarity-reversing device.

5 Claims, 35 Drawing Figures

PRIOR ART

FIG. 1 PRIOR ART
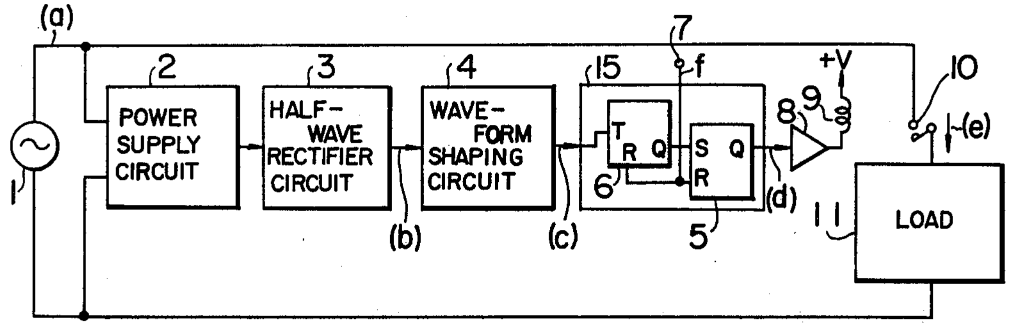
PRIOR ART
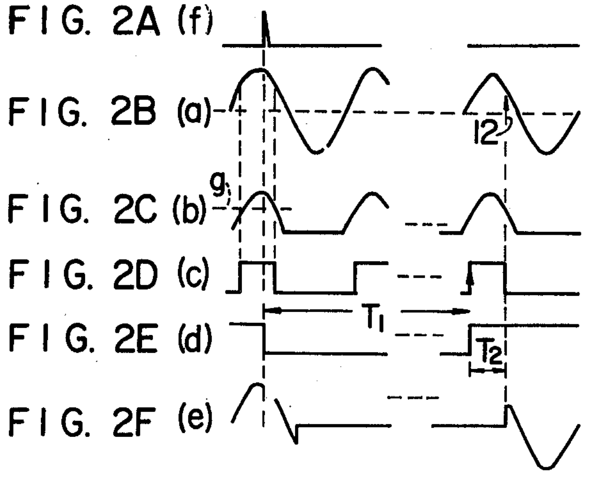

FIG. 7
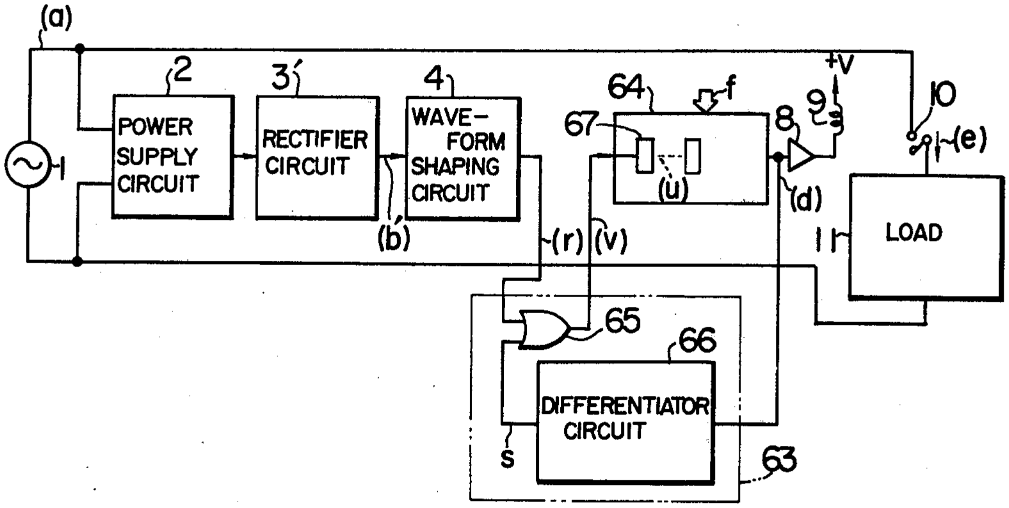
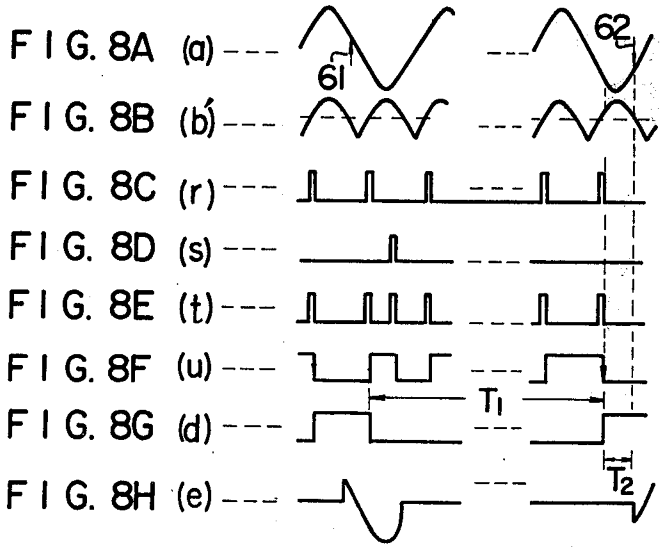

RELAY CONTROL CIRCUIT

BACKGROUND OF THE INVENTION

1. Field of the Invention

This invention relates to a relay control circuit, or more in particular to a relay control circuit in which the welding of the contacts of the relay is prevented in a circuit where the on-off operation of the relay is controlled by the timer utilizing a commercial power supply as a reference clock pulse.

The present invention is suitably applied especially to the relay control circuit of a room air conditioner, a refrigerator and the like.

2. Description of the Prior Art

In conventional relay control circuits used with various devices, a timer circuit is controlled by use of a commercial power supply as a reference clock pulse, so that the relay is turned on and off by the output of the timer circuit. The phase of the output signal of the timer circuit for turning on and off the relay is synchronous with that of the reference clock pulse. As a result, the direction and phase of the current supplied from the commercial power supply which flows in the contact of the relay turned on and off are always identical, thus causing an accident of the welding of the relay contact.

A conventional relay control circuit shown in FIG. 1 will be described below with reference to the signal waveforms shown in FIGS. 2A to 2F.

In FIG. 1, reference numeral 1 shows a commercial power supply. At the output terminal of the commercial power supply 1, an AC voltage a as shown in FIG. 2B is generated. The voltage a, after being applied through a power supply circuit 2 including a transformer, is half-wave rectified by a half-wave rectifier circuit 3, which produces at the output thereof a signal b as shown in FIG. 2C. The half-wave rectified signal b is shaped in waveform by being sliced at the threshold level g at the waveform-shaping circuit 4, at the output of which is produced reference clock pulses c as shown in FIG. 2D. The reference clock pulses c are applied to the trigger terminal T of the frequency divider 6 of the timer circuit 15 including the frequency divider 6 and an RS flip-flop 5. In the timer circuit 15, numeral 7 shows a reset signal input terminal to which a reset signal f shown in FIG. 2A is applied. The reset signal f is generated by a push button which is adapted to be depressed when it is desired that current supply to the load or like be stopped.

A buffer amplifier 8 is turned on and off by the output of the timer circuit 15. When the amplifier 8 is turned on, the current flows in the coil 9 of the relay and the contact 10 of the relay is closed, so that the AC voltage e from the AC power supply 1 is applied to the load 11 and the current in phase with the voltage e flows through the contact 10.

Assume that current is flowing in the coil 9 with the output signal d of the timer circuit 15 kept at high level H and that the reset signal f is supplied to the reset signal input terminal 7 without regard to the reference clock pulses c. The frequency divider 6 and the RS flip-flop 5 are reset by the reset signal f, with the result that the output signals of the frequency-divider 6 and the RS flip-flop 5 are reduced to L level. In other words, the output signal d of the timer circuit 15 is reduced to level L the instant the reset signal f is applied thereto as shown in FIG. 2A. After the lapse of time $T_1$ of the timer operation stoppage which is set by the number of stages of the frequency divider 6, a pulse produced from the Q output terminal of the frequency divider 6 sets the RS flip-flop 5, thus raising the timer output signal d to H level. The timer output signal d is raised to H level in the same timing as the output signal of the frequency divider 6 is raised to H level. The timing at which the output signal of the frequency divider 6 is raised to H level, in turn, is identical to that of rise of the reference clock pulse c. In other words, the phase in which the output signal d of the timer circuit 15 is reduced to L level is determined by the timing of the reset signal F at random, but the output signal d of the timer circuit 15 is raised to H level at the same timing as the rise of the reference clock pulse c.

Assume that it takes time $T_2$ before the contact 10 is closed by the current flow in the coil 9 with the turning on of the buffer amplifier 8 after the output signal of the timer circuit 15 is raised to H level. The contact 9 is closed after the lapse of time $T_2$ following the time point when the output signal of the timer circuit 15 is raised to H level, i.e., after the lapse of time $T_2$ following the time point when the reference clock pulse c is raised to H level. The phase of the AC voltage a associated with the closing of the contact is always identical as shown by the arrow. Accordingly, the voltage e supplied to the contact 10 of the relay, namely, the current flowing in the contact 10 is always in the same direction and same phase as shown in FIG. 2F. That is, it is identical to the supply of the DC current, with the result that transfer of the contact occurs. This shortens the service life of the contact and finally causes the welding thereof.

SUMMARY OF THE INVENTION

An object of the present invention is to provide a novel and useful relay control circuit.

Another object of the invention is to provide a relay control circuit for preventing the degeneration or welding of the contact thereof in such a way that contact transfer is reduced by reversing the direction of current flow in the contact each time the relay is opened and closed.

Still another object of the invention is to provide a relay control circuit the contact of which is opened or closed when the amplitude of the AC current supplied from the commercial power supply is reduced to zero.

BRIEF DESCRIPTION OF THE DRAWINGS

FIG. 1 is a block diagram showing a conventional relay control circuit.

FIGS. 2A to 2F show waveforms of signals produced at various parts of the circuit of FIG. 1.

FIGS. 4A to 4I show waveforms of the signals produced at various parts of the circuit of FIG. 3.

FIG. 7 is a block diagram showing still another embodiment of the relay control circuit according to the present invention.

FIGS. 8A to 8H show waveforms of signals produced at various parts of the circuit shown in FIG. 7.

DESCRIPTION OF THE PREFERRED EMBODIMENTS

Figure 3:
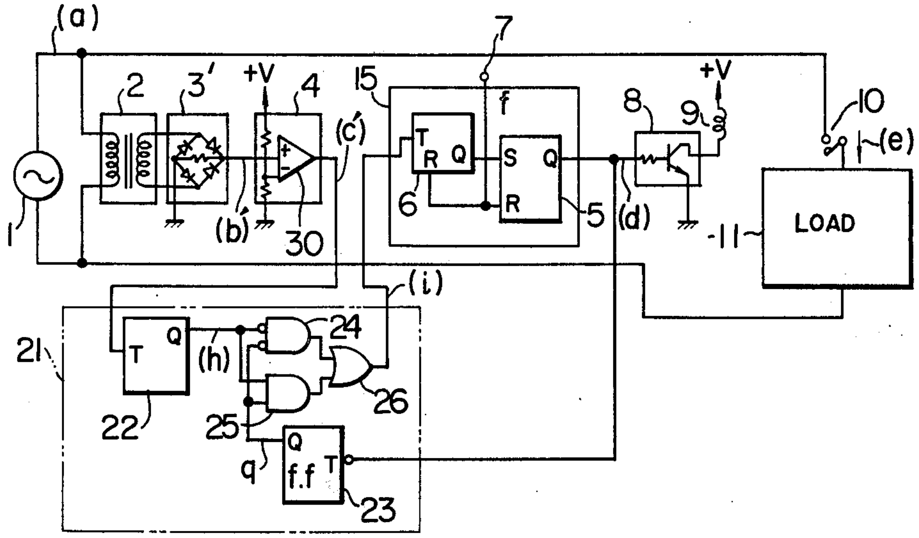
FIG. 3 is a block diagram showing an embodiment of the relay control circuit according to the present invention.

A block diagram of an embodiment of the relay control circuit according to the invention is shown in FIG. 3. The commercial voltage a taken out of a commercial power supply 1 is decreased in voltage at a power supply circuit 2 and full-wave rectified at a full-wave rectifier circuit 3', thereby producing a full-wave rectified signal b' shown in FIG. 4B. The full-wave rectified signal b' is applied to a waveform-shaping circuit 4. The waveform-shaping circuit 4 is a comparator-amplifier having two terminals one of which is supplied with a reference bias voltage and the other of which is impressed with the full-wave rectified signal b'. As a result, the waveform-shaping circuit 4 produces a signal, i.e., reference clock pulses c' of FIG. 4C which is increased to H level when the full-wave rectified signal b' is higher than the reference bias voltage, and is reduced to L level when the full-wave rectified signal b' drops below the reference bias voltage.

Figures 4A, 4D, 4E, 4F, 4G, 4H, 4I:
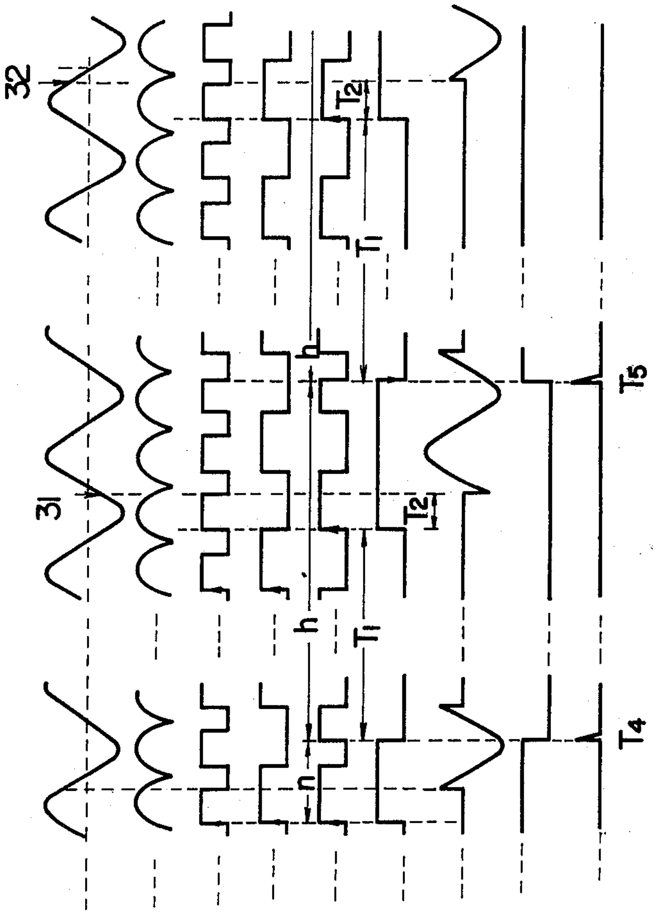
Figures 6A, 6B, 6C, 6D, 6E, 6F, 6G, 6H:
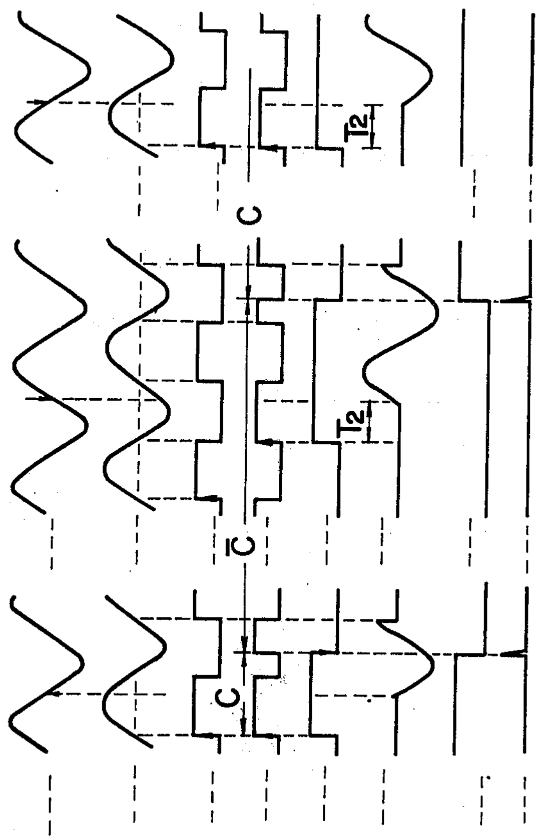
FIGS. 6A to 6H show waveforms of the signals produced at various parts of the circuit shown in FIG. 5.

The signal c' is applied to a polarity-reversing circuit 21 which makes up a feature of the present invention. The polarity-reversing circuit 21 includes T flip-flops 22 and 23, a NOR circuit 24, an AND circuit 25 and an OR circuit 26. From the output terminal of the polarity-reversing circuit 21, the signal i of FIG. 4E is produced as mentioned later, which signal is used to trigger the timer circuit 15. When a reset pulse f is applied to the terminal 7, the frequency divider 6 and the RS flip-flop 5 are reset, so that the output of the timer circuit 15 is reduced to L level. As a result, the buffer amplifier 8 is cut off, and current is prevented from flowing in the coil of the relay, thereby opening the contact 10 thereof. With the lapse of the time set by the number of stages of the frequency divider 6, the Q terminal of the frequency divider 9 is raised to H level, so that the output terminal of the RS flip-flop is also raised to H level. The output of the timer circuit 15 turns on the buffer amplifier 8, with the result that current flows in the coil 9 of the relay. Thus the contact 10 is closed and current flows in the load. In other words, the contact 10 is closed and current flows in the load 11 with the lapse of delay time, i.e., time $T_2$ required before current flows in the coil 9 with the lapse of the delay time of the buffer amplifier 8 after the output of the timer circuit 15 is raised to H level.

In the polarity-reversing circuit 21, the T flip-flop 22 is adapted to operate with the rise of the reference clock pulse applied to the trigger terminal T, and therefore the output thereof takes the form of a signal h of FIG. 4D having the frequency one half that of the reference clock pulses. Also, the T terminal of the T flip-flop 23 is impressed with a reversed signal of the output signal d produced from the timer circuit 15, so that the signal q as shown in FIG. 4H which is reversed with the fall of the output signal d is obtained at output terminal Q.

Signals h and q are both applied to the input terminals of the NOR circuit 24 respectively on the one hand and to the input terminals of the AND circuit 25 on the other hand. The output terminals of the NOR circuit 24 and AND circuit 25 are connected to the input terminals of the OR circuit 26, the output terminal of which is connected to the input terminal of the timer circuit 15, i.e., the T terminal of the frequency divider 6.

Now, assume that the output signal i is produced at the output of the OR circuit 26. The output signal i is a logic product of the signal h or a reversed signal thereof and the signal q, and expressed as $i=h\cdot q+\bar{h}\cdot\bar{q}$. As a result, the signal i is the same as signal h when the signal q is a H level, i.e., $i=h$, while $i=\bar{h}$ when the signal q is at L level. In other words, when signal q is at H level, the output signal h of the T flip-flop 22 is produced in the form of signal i at the output terminal of the OR circuit 26, while when the signal q is at L level, the output signal h of the T flip-flop 22 is reversed at the NOR circuit 24 and then produced in the form of signal i at the output of the OR circuit 26.

The signal q is in synchronism with the fall of the signal d and the frequency thereof is one half that of signal d, so that the signal q changes in level at each cycle of signal d, with the result that the signal i takes the form of signal h reversed with the fall of signal d.

Now assume that a reset signal f is applied to the reset input terminal 7 at time point $T_4$. The output signal d of the timer circuit 15 is reduced to L level. The fall of the output signal d causes the signal q to be also reduced to L level, so that the signal i takes the form of signal h with the phase thereof reversed. After the passage of time $T_1$, the output signal of the timer circuit 15 becomes a signal which rises in synchronism with the rise of the signal i, i.e., $\bar{h}$. Therefore, the contact is closed with the passage of time $T_2$ thereafter, i.e., when the phase of the output voltage a of the commercial power supply 1 as shown by arrow 31 appears.

Next, at time point $T_5$ when a reset pulse is applied to the reset signal input terminal 7, the output signal of the timer circuit 15 is reduced from H to L level. The signal q which changes in level synchronously with the fall of signal d is raised from L to H level. As a result, the output signal i is reversed in phase and takes the form of signal h. With the lapse of time $T_1$ from time point $T_5$, the output of the timer circuit 15 is raised from L to H level in synchronism with the rise of signal i, namely, the fall of signal h, and therefore, with the lapse of time $T_2$ thereafter, the contact 10 of the relay is closed. The AC voltage (current) a supplied from the commercial power supply 1 when the contact 10 is closed is, as seen from arrow 32, opposite in polarity and equal in absolute value to the voltage (current) shown by the arrow 31.

As described above, in the embodiment of FIG. 3, each time the timer circuit 15 is turned off, the phase of the input signal to the timer circuit 15 is reversed, so that the current caused by turning on of the contact of the relay alternately takes positive and negative levels equal in absolute value. As noted from the foregoing description, each time the relay is turned on or off by the timer circuit 15, the phase of the current flowing in the contact alternates between positive and negative levels equal in absolute value. Therefore, even if the transfer of the contact occurs, accumulation does not occur only on one side unlike in the conventional control circuit, thus lengthening the service life of the contact while at the same time preventing such an accident as welding of the contact.

Figure 5:
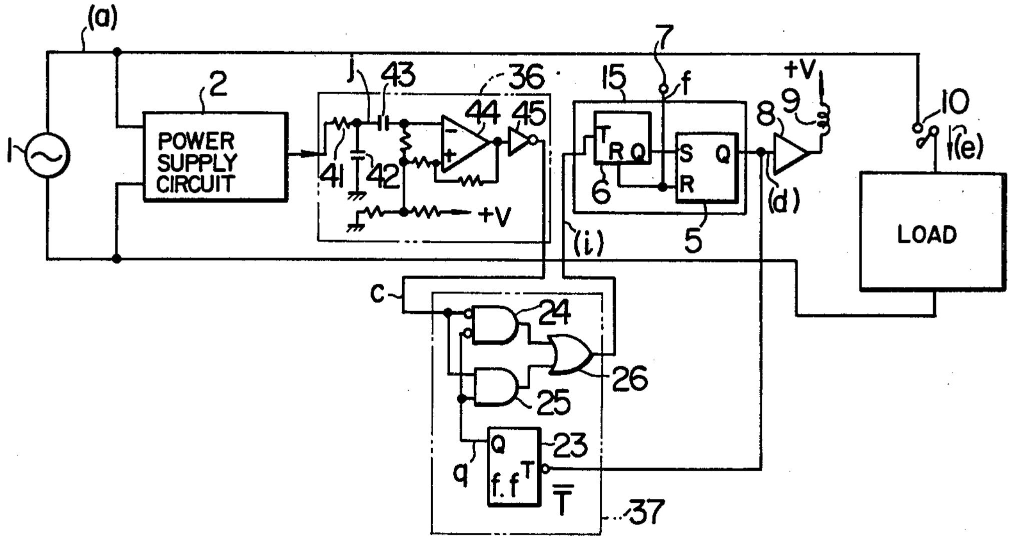
FIG. 5 is a block diagram showing another embodiment of the relay control circuit according to the present invention.

In the embodiment shown in FIG. 5, a phase shifter circuit such as a CR filter is included in the waveform-shaping circuit 36. The resistance of the CR filter is changed to change the delay time of the phase shifter circuit, thereby reducing substantially to zero the amplitude of the current thrown in when the contact 10 is turned on.

This embodiment of the invention will be explained below with reference to the block diagram of FIG. 5 and the signal waveforms shown in FIGS. 6A to 6H.

The embodiment of FIG. 5 is different from that of FIG. 3 in that in the embodiment of FIG. 5 a phase circuit including a resistor 41 and a capacitor 42 are added to the waveform-shaping circuit 36 and in that the T flip-flop 22 used in the embodiment of FIG. 3 is eliminated from the polarity-reversing circuit 37. In the embodiment shown in FIG. 5, the signal produced from the power supply circuit 2 is delayed by the phase shifter circuit including the resistor 41 and the capacitor 42, and takes the form of the signal j of FIG. 6B. The signal j, after its DC portion is cut off through the capacitor 43, is applied to the comparator 44 which produces a pulse signal reversed in phase. The output of the comparator 44 is reversed by the reversing circuit 45 for producing reference clock pulses c of FIG. 6C.

The reference clock pulses c fail to be applied through the full-wave rectifier 3′ shown in FIG. 3 and therefore have the same frequency as signal h shown in FIG. 4D.

In the embodiment of FIG. 5, as in the embodiment of FIG. 3, the output signal of the timer circuit 15 is such that signal q is produced at the Q terminal of the T flip-flop 23. The signals c and q are applied to the input terminals of the NOR circuit 24 and the AND circuit 25 respectively, while the output signals of the NOR circuit 24 and AND circuit 25 are applied through the OR circuit 26 to the timer circuit 15. As a result, when signal q is at H level, i=c, while when signal q is at L level, $i=\bar{c}$.

In other words, the input signal to the timer circuit 15 is reversed in phase in synchronism with the fall of the output signal d, so that even when the delay time due to the phase shifter circuit including the resistor 41 and the capacitor 42 is proper, the phase of the current thrown in with the closing of the contact 10 alternates between positive an negative levels equal in the absolute value of amplitude.

Further, by properly determining the delay time due to the phase shifter circuit including the resistor 41 and the capacitor 42, the contact 10 is closed when the phase of the voltage (current) a is zero.

As a consequence, in the embodiment of FIG. 5, the transfer of the contact 10 and the welding thereof are prevented.

By the way, in the case where the timer circuit 15 included in the embodiment of FIG. 5 is so configured that the output level of the timer circuit 15 is raised to H in response to a reset signal applied thereto and reduced to L after the lapse of a predetermined length of time, the phase of the current flowing when the contact 10 opens alternates between positive and negative levels.

Still another embodiment of the relay control circuit according to the present invention is illustrated in the block diagram of FIG. 7. This embodiment is the same as the conventional relay control circuit explained with reference to FIG. 1 except that in the embodiment under consideration a full-wave rectifier circuit 3′ is used as the rectifier circuit, that the waveform-shaping circuit 4 produces a pulse when the threshold voltage is exceeded and that a pulse adder circuit 63 which makes up an essential part of the embodiment under consideration is newly included.

The operation of the circuit shown in FIG. 7 will be explained with reference to the signal waveform diagram of FIGS. 8A to 8H. The signal a produced from the power supply 1 is full-wave rectified by the rectifier circuit 3′, so that the waveform-shaping circuit 4 produces a pulse when the voltage level of the rectified signal b′ exceeds the threshold voltage. This pulse is used as a reference clock pulse. This reference clock signal is applied to one terminal of the OR gate 65 of the pulse adder circuit 63. The control output signal d produced from the timer circuit 64, on the other hand, is delayed and differentiated by the differentiator circuit 66 of the pulse adder circuit 63, and in the form of signal s, applied to the other terminal of the OR gate 65. Consequently, the signal s and the reference clock signal r make up the output signal t of the pulse adder circuit 63. This signal t is applied to the first stage of the frequency divider which makes up a reference signal circuit of the timer circuit 64 and operates with a fall input thereto. Thus the output u of the first stage 67 of the frequency divider is used as a reference clock signal for the control circuit 64, with the result that each time of fall of the output signal d of the control circuit, the phase of the fall of the first stage output u of the frequency divider with respect to the commercial power supply 1 is reversed. Assuming that the phase is positive as shown at 61 when the relay is first turned on, therefore, the phase at the next turning on of the relay the set timer operation time $T_1$ after the turning off of the relay regardless of the phase of the commercial power supply is negative as shown by numeral 62. Also, the absolute value of the current thrown in at that time remains the same. Thus each time the relay is turned on and off by the controlling operation of the timer circuit, the phase of the current flowing in the contact 10 alternates between positive and negative levels with the same absolute value. Even if the transfer of the contact occurs, therefore, no one-sided accumulation occurs unlike the conventional control devices.

Next, explanation will be made of the case where the relay is subjected to zero-volt switching in order to reduce the supplied current to substantially zero in absolute value. This is made possible by providing the waveform-shaping circuit 4 with such a phase shifter circuit as a CR filter doubling as a noise filter, and by determining the delay time and threshold level of the phase shifter circuit in such a manner that the phase of the supplied current of the relay (at points 61 and 62 in FIG. 8) becomes zero taking the operation time of the relay into consideration.

We claim:

1. A relay control circuit comprising a commercial power supply, a waveform-shaping circuit for shaping the waveform of the voltage applied from said commercial power supply thereby to produce a reference clock pulse signal, a timer circuit, a relay turned on and off in response to an output signal of said timer circuit, a polarity-reversing circuit the output of which is reversed in response to the output signal of said timer circuit, and means for applying to said timer circuit through said polarity-reversing circuit said reference clock signal produced from said waveform shaping circuit.

2. A relay control circuit according to claim 1, in which said polarity-reversing circuit includes a T flip-flop triggered in response to the output signal of said timer circuit, a NOR circuit to which the output signal of said T flip-flop and said reference clock pulse signal are applied, an AND circuit to which the output signal of said T flip-flop and said reference pulse signal are applied, and an OR circuit to which the outputs of said NOR circuit and said AND circuit are applied.

3. A relay control circuit according to claim 1, in which said waveform-shaping circuit comprises a phase shifter circuit for shifting a phase of a voltage produced from said commercial power supply, and a comparator for comparing a voltage produced from said phase shifter circuit with a reference voltage thereby to produce a reference clock pulse.

4. A relay control circuit according to claim 1, in which said polarity reversing circuit comprises a differentiator circuit for differentiating an output signal of said timer circuit, and an OR gate supplied with an output signal of said differentiator circuit and said reference clock pulse.

5. A relay control circuit comprising a commercial power supply; a waveform-shaping circuit for shaping the waveform of an AC voltage produced from said commercial power supply thereby to produce a reference clock pulse signal at the output thereof, said waveform-shaping circuit including a comparator; a timer circuit including a frequency divider and an RS flip-flop, said timer circuit producing an output signal of L level in response to a reset signal and producing an output signal of H level in synchronism with the clock pulse signal applied to said timer circuit, after a predetermined length of time; a polarity-reversing circuit the output of which is reversed in polarity in response to the output signal of said timer circuit; means for applying said reference clock pulse signal through said polarity-reversing circuit to said timer circuit; a buffer amplifier turned on and off in response to the output signal of said timer circuit, and a relay actuated in response to the output signal of said buffer amplifier.

* * * * *